US008566739B2

(12) United States Patent
Kracht

(10) Patent No.: US 8,566,739 B2
(45) Date of Patent: Oct. 22, 2013

(54) INPUT FIELD FOR GRAPHICAL USER INTERFACE

(75) Inventor: Stefan Kracht, Berlin (DE)

(73) Assignee: SAP AG, Walldorf (DE)

(*) Notice: Subject to any disclaimer, the term of this patent is extended or adjusted under 35 U.S.C. 154(b) by 2030 days.

(21) Appl. No.: 10/963,352

(22) Filed: Oct. 12, 2004

(65) Prior Publication Data
US 2006/0080618 A1  Apr. 13, 2006

(51) Int. Cl.
*G06F 3/048* (2013.01)
(52) U.S. Cl.
USPC ........... 715/780; 715/224; 715/225; 715/766; 715/767; 715/768
(58) Field of Classification Search
USPC ............ 715/780, 507, 508, 865, 224–225, 715/766–768
See application file for complete search history.

(56) References Cited

U.S. PATENT DOCUMENTS

| | | | |
|---|---|---|---|
| 3,872,460 A * | 3/1975 | Fredrickson et al. | 715/788 |
| 4,823,303 A * | 4/1989 | Terasawa | 715/515 |
| 5,303,042 A | 4/1994 | Lewis et al. | |
| 5,677,991 A * | 10/1997 | Hsu et al. | 704/255 |
| 6,049,811 A * | 4/2000 | Petruzzi et al. | 715/507 |
| 6,119,213 A | 9/2000 | Robbins | |
| 6,590,595 B1 * | 7/2003 | Wagner et al. | 715/784 |
| 6,765,595 B2 * | 7/2004 | Lee et al. | 715/780 |
| 6,863,458 B2 * | 3/2005 | Konishi et al. | 400/611 |
| 7,080,325 B2 * | 7/2006 | Treibach-Heck et al. | 715/780 |
| 7,278,113 B1 * | 10/2007 | Racine et al. | 715/780 |
| 7,318,198 B2 * | 1/2008 | Sakayori et al. | 715/729 |
| 2003/0035011 A1 * | 2/2003 | Lee et al. | 345/780 |
| 2003/0078949 A1 * | 4/2003 | Scholz et al. | 707/505 |
| 2003/0144949 A1 * | 7/2003 | Blanch | 705/38 |

FOREIGN PATENT DOCUMENTS

JP          09036934        *  2/1997

* cited by examiner

*Primary Examiner* — Tadeese Hailu
(74) *Attorney, Agent, or Firm* — Finnegan, Henderson, Farabow, Garrett & Dunner, LLP

(57) ABSTRACT

Methods and apparatus, including computer program products, for and input field on a graphical user interface (GUI). The graphical user interface (GUI) includes one or more input fields that, when activated in response to a stimulus, display one or more associated projected input fields showing a maximum width of the respective input fields.

27 Claims, 3 Drawing Sheets the field of the input filed 50 is utilized. This is not very user

INPUT FIELD FOR GRAPHICAL USER INTERFACE

BACKGROUND

The present invention relates to data processing by digital computer, and more particularly to an input field for a graphical user interface (GUI).

Applications typically use elements of a GUI that come with an operating system and add their own GUI elements and ideas. A GUI sometimes uses one or more metaphors for objects familiar in real life, such as the desktop, the view through a window, or the physical layout in a building. Elements of a GUI include, for example, windows, pull-down menus, buttons, scroll bars, iconic images, wizards, mouse, and one or more input fields. A system's GUI, along with its input devices, is sometimes referred to as its "look-and-feel."

SUMMARY

The present invention provides methods and apparatus, including computer program products, for an input field for a graphical user interface (GUI).

In general, in one aspect, the invention features a method including, on a graphical user interface (GUI), displaying an input field, activating the input field in response to a stimulus, and projecting the activated input field, the projected input field displaying a maximum width of the input field.

In embodiments, the stimulus can be a mouse click or a keyboard stroke. The projected input field can be a raster. The projected input field can include demarcations. The demarcations can include one or more commas, one or more periods, or one or more symbols.

In another aspect, the invention features a graphical user interface (GUI) including one or more input fields that, when activated in response to a stimulus, display one or more associated projected input fields showing a maximum width of the respective input fields.

In embodiments, the stimulus can be a mouse click or a keyboard stroke. The projected input field can be a raster. The projected input field can include demarcations. The demarcations can include one or more commas, one or more periods, or one or more symbols.

Other features and advantages of the invention are apparent from the following description, and from the claims.

DETAILED DESCRIPTION

Figure 1:
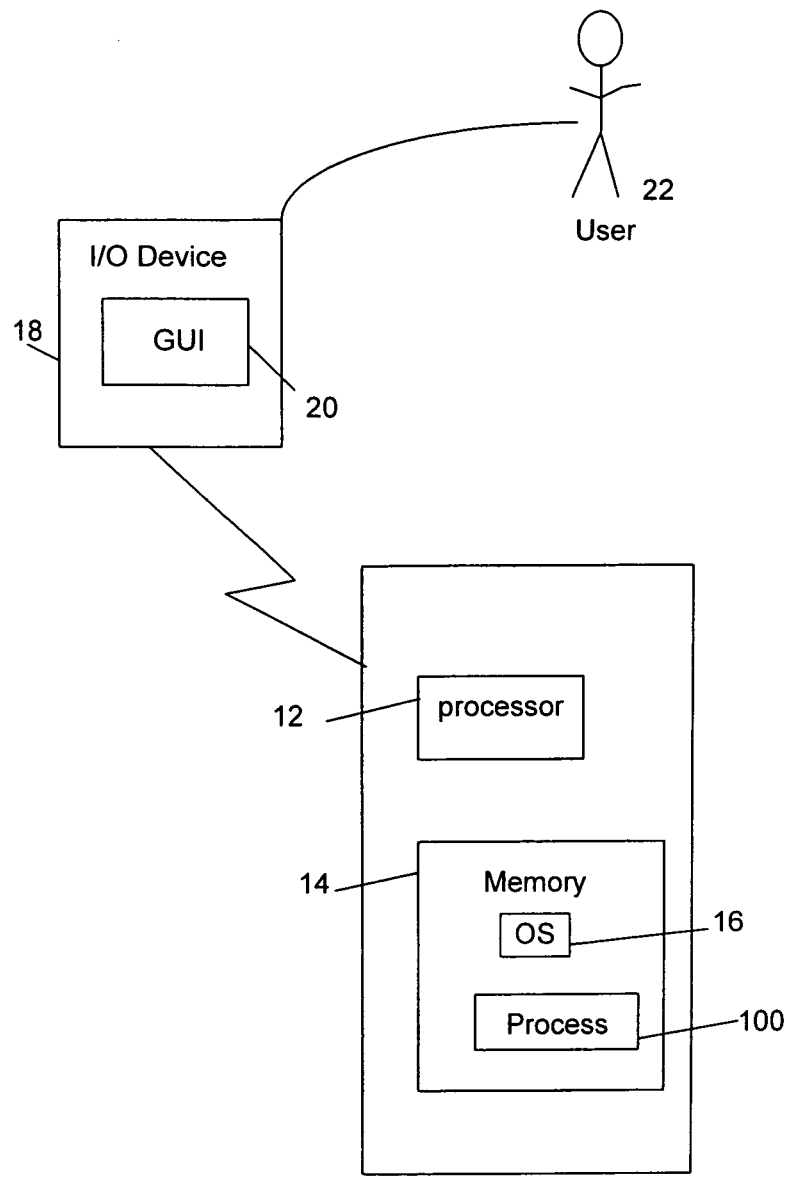
FIG. 1 is a block diagram.

As shown in FIG. 1, an exemplary system 10 includes a processor 12 and memory 14. Memory 14 includes an operating system (OS) 16, such as Linux, Unix or Windows, and an input field display process 100. The system 10 also includes an input/output (IO) device 18 for display of a graphical user interface (GUI) 20 to a user 22.

Figure 2:
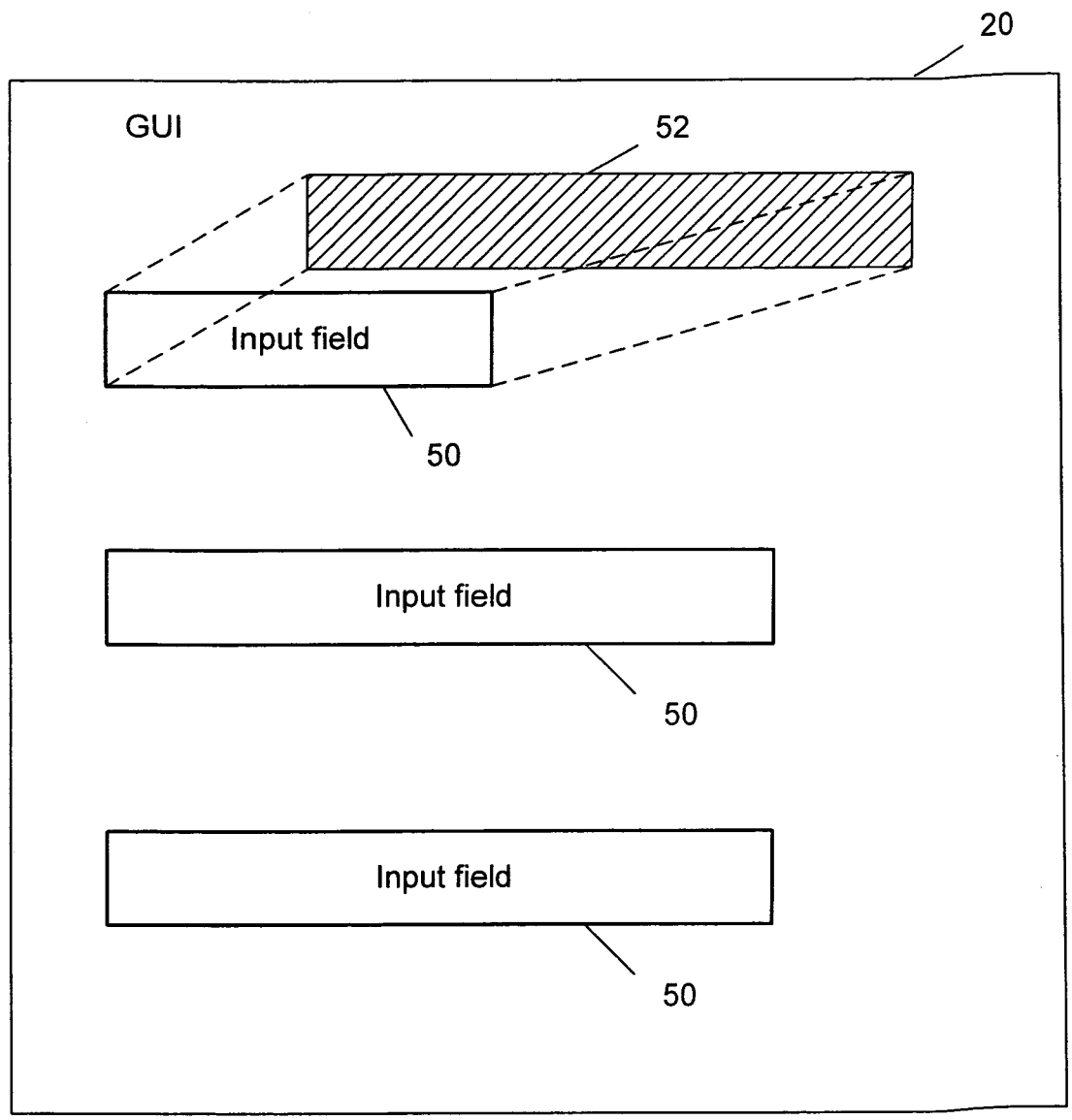
FIG. 2 is a block diagram.

As shown in FIG. 2, the GUI 20 includes one or more displayed fields (also referred to as input fields) 50 for receipt of a user input. User input can include, for example, numeric and alphanumeric data. An example of alphanumeric data that can be inputted into the displayed field 50 is a user's home street address.

When entering data into the displayed field 50 a visible width of the field often does not represent a maximum width of the input field. One reason for this is that character fonts do not have a fixed size. As a result, entering input into the displayed field can often abruptly stop before the entire width of the displayed input filed 50 is utilized. This is not very user friendly because the displayed field 50 should clearly show how much data the user 22 can enter.

The visible input width of the displayed field 50 is fixed by a developer at a design stage. Different character sets have different space requirements, for example, for the same word width. In addition, input of long numbers in the displayed field 50 can be difficult without using some type of input mask. When a user activates the displayed field 50 on GUI 20 a projected input field 52 is displayed. Display field 50 is activated in response to a user action, such as, for example, pressing the tab key on a keyboard input device, clicking a mouse pointer that is pointing at the displayed field 50, or some other appropriate user action. The projected input field 52 is a raster or pattern that shows the displayed input field 50 width, and in one particular example, includes set marks for the raster. A raster is a grid of x and y coordinates on a display space such as GUI 20. A raster image file identifies which of these coordinates to illuminate in monochrome or color values. The raster file is sometimes referred to as a bitmap because it contains information that is directly mapped to the display grid.

The projected input field 52 visualizes how much data (e.g., width) the user 22 can enter into any of the one or more displayed fields 50 once activated. Displaying the projected input field 52 provide a user an ability to utilize the entire width of the input field 50.

In another particular example, the projected input field 52 include a color of a background field changing when the end of the maximum width in projected input filed 52 is reached. In still other particular examples, a cursor shape is temporarily changed when the end of the maximum width of the projected input filed 52 is reached, an acoustic signal is sounded when the end of the maximum width of the projected input filed 52 is reached, and/or a counter is displayed in a task bar or other suitable area on the GUI 20 showing the maximum width of the projected input filed 52 and amount remaining for user input.

Figure 3:
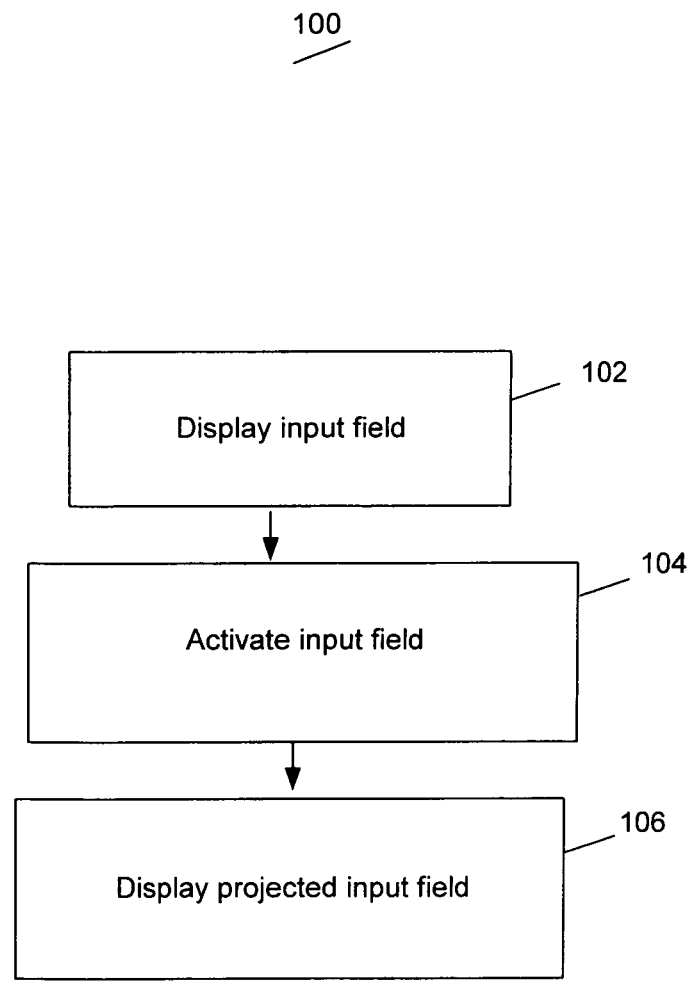
FIG. 3 is a flow diagram.
Like reference numbers and designations in the various drawings indicate like elements.

As shown in FIG. 3, the input field display process 100 includes displaying (102) an input field on a graphical user interface (GUI). Process 100 activates (104) the input field in response to a stimulus. The stimulus can be, for example, a pressing the tab key on a keyboard input device, a clicking of a mouse pointer that is pointing at the displayed field, or some other appropriate user action.

Process 100 displays (106) a projected input field in response to the activation (104). The displayed projected input field shows the maximum width of the field and allows a user to input numeric and/or alphanumeric data into the projected input field.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
    on a graphical user interface (GUI), displaying a first input field having a display width;
    activating the first input field in response to a stimulus;
    displaying, adjacent to the activated first input field, a second input field, the second input field having a display width greater than the display width of the activated first input field, wherein the second input field indicates a maximum display width of the activated first input field, the maximum width being equal to the display width of the second input field; and
    indicating a maximum amount of data allowed to be entered in the activated first input field by changing the display of the activated first input field or second input field when the maximum amount of data is entered,
    wherein the maximum amount of data is calculated based on the maximum width, and
    wherein the second input field corresponds to an image file including a grid of first coordinates and second coordinates, at least a portion of the first and second coordinates identifying one or more locations on a display grid that are illuminated to display the second input field.
2. The method of claim 1 wherein the stimulus is a mouse click.
3. The method of claim 1 wherein the stimulus is a keyboard stroke.
4. The method of claim 1 wherein the second input field is a raster.
5. The method of claim 4 wherein the second input field includes demarcations.
6. The method of claim 5 wherein the demarcations include one or more commas.
7. The method of claim 5 wherein the demarcations include one or more periods.
8. The method of claim 5 wherein the demarcations include one or more symbols.
9. The method of claim 1 wherein changing the display comprises one or more of the following:
    changing a color of a background field of the second input field, or temporarily changing a cursor shape.
10. A graphical user interface (GUI) comprising:
    a first input field having a display width, the first input field being activated in response to a stimulus;
    a second input field associated with the activated first input field, the second input field being displayed adjacent to the activated first input field and having a display width greater than the display width of the activated first input field, wherein the second input field indicates a maximum display width of the activated first field, the maximum width being equal to the display width of the second input field; and
    one or more visual notifications indicating a maximum amount of data allowed to be entered in the activated first input field by changing the display of the activated first input field or second input field when the maximum amount of data is entered,
    wherein the maximum amount of data is calculated based on the maximum width, and
    wherein the second input field corresponds to an image file including a grid of first coordinates and second coordinates, at least a portion of the first and second coordinates identifying one or more locations on a display grid that are illuminated to display the second input field.
11. The GUI of claim 10 wherein the stimulus is a mouse click.
12. The GUI of claim 10 wherein the stimulus is a keyboard stroke.
13. The GUI of claim 10 wherein the second input field is a raster.
14. The GUI of claim 10 wherein the second input field includes demarcations.
15. The GUI of claim 14 wherein the demarcations include one or more commas.
16. The GUI of claim 14 wherein the demarcations include one or more periods.
17. The GUI of claim 14 wherein the demarcations include one or more symbols.
18. The GUI of claim 10 wherein changing the display comprises one or more of the following:
    changing a color of a background field of the second input field, or temporarily changing a cursor shape.
19. An apparatus comprising:
    an input/output (I/O) device for display of a graphical user interface (GUI), the GUI comprising:
        a first input field having a display width, the first input field being activated in response to a stimulus;
        a second input field associated with the activated first input field, the second input field being displayed adjacent to the activated first input field and having a display width greater than the display width of the activated first input field, wherein the second input field indicates a maximum display width of the activated first input field, the maximum width being equal to the display width of the second input field; and one or more visual notifications indicating a maximum amount of data allowed to be entered in the activated first input field by changing the display of the activated first input field or second input field when the maximum amount of data is entered, wherein the maximum amount of data is calculated based on the maximum width, and wherein the second input field corresponds to an image file including a grid of first coordinates and second coordinates, at least a portion of the first and second coordinates identifying one or more locations on a display grid that are illuminated to display the second input field.

20. The GUI of claim 19 wherein the stimulus is a mouse click.

21. The GUI of claim 19 wherein the stimulus is a keyboard stroke.

22. The GUI of claim 19 wherein the second input field is a raster.

23. The GUI of claim 22 wherein the second input field includes demarcations.

24. The GUI of claim 23 wherein the demarcations include one or more commas.

25. The GUI of claim 23 wherein the demarcations include one or more periods.

26. The GUI of claim 23 wherein the demarcations include one or more symbols.

27. The GUI of claim 19 wherein changing the display comprises one or more of the following:

changing a color of a background field of the second input field, or temporarily changing a cursor shape.

* * * * *